(12) United States Patent
Vazquez del Mercado et al.

(10) Patent No.: US 6,240,653 B1
(45) Date of Patent: Jun. 5, 2001

(54) GAS-BLOWING DEVICE FOR CLEANING AND DRYING A PLURALITY OF PLATE LUG SURFACES FOR PRODUCING PORE-FREE CAST-ON-STRAP JOINTS FOR LEAD-ACID BATTERIES

(75) Inventors: Luis Francisco Vazquez del Mercado, Monterrey; Gregorio Vargas Gutierrez; Jorge Lopez-Cuevas, both of Saltillo, all of (MX)

(73) Assignee: Acumuladores Mexicanos, S.A. de C.V., Monterrey (MX)

( * ) Notice: Subject to any disclaimer, the term of this patent is extended or adjusted under 35 U.S.C. 154(b) by 0 days.

(21) Appl. No.: 09/081,747

(22) Filed: May 20, 1998

(51) Int. Cl.$^7$ .................................................. F26B 19/00
(52) U.S. Cl. ................................ 34/216; 34/229; 34/230; 34/232
(58) Field of Search ............................... 34/60, 61, 90, 34/103, 107, 614, 174, 209, 210, 216, 222, 229, 230, 232; 110/264, 105; 429/122, 209, 211; 29/592.1, 623.1, 730; 285/179.2, 179

(56) References Cited

U.S. PATENT DOCUMENTS

| | | | |
|---|---|---|---|
| 1,766,742 | * 6/1930 | Campbell | 34/229 X |
| 3,003,177 | * 10/1961 | Hijiya | 34/229 X |
| 4,420,854 | * 12/1983 | Newton | 34/229 X |
| 5,068,977 | * 12/1991 | Syori et al. | 34/229 X |
| 5,404,865 | * 4/1995 | Huls | 34/232 X |
| 5,836,084 | * 11/1998 | Jackson et al. | 34/107 |

* cited by examiner

*Primary Examiner*—Henry Bennett
*Assistant Examiner*—Steve Gravini
(74) *Attorney, Agent, or Firm*—Harrison & Egbert

(57) ABSTRACT

A gas-blowing device used in an apparatus for carrying out a process for producing pore-free cast-on-strap joints for lead-acid batteries. The device includes a metallic pipe closed at both ends having a plurality of groups of aligned gas outlets, gas inlets and inner plugs, all of which are evenly distributed along the pipe's length, and leveling plates. The gas-blowing device is used to give a simultaneous final cleaning and drying to a plurality of negative and positive plate lug surfaces immediately after water rinsing the plate lugs under ultrasonic vibration and prior to joining the plate lugs by the cast-on-strap process. This is done by means of gas jets coming out at high pressure from the gas outlets, and which are directed towards the plate lug surfaces. A uniform distribution of gas pressure and flow rate for all gas outlets, as well as a correct direction for all gas jets, are assured along the entire pipe's length.

2 Claims, 2 Drawing Sheets

GAS-BLOWING DEVICE FOR CLEANING AND DRYING A PLURALITY OF PLATE LUG SURFACES FOR PRODUCING PORE-FREE CAST-ON-STRAP JOINTS FOR LEAD-ACID BATTERIES

TECHNICAL FIELD

The present invention relates generally to the manufacture of batteries. More particularly, the present invention relates to a gas-blowing device to be used in an apparatus for the manufacture of cast-on-strap joints for lead-acid batteries.

BACKGROUND OF THE INVENTION

A complete conventional lead-acid battery assembly consists of the cell elements, intercell connectors, a container, a cover, vent plugs and terminal posts. A cell element is formed by stacking together alternate negative and positive plates, with separators. A plate is composed by a lead-based plate grid carrying an active material paste. Each one of the plate grids has an integral plate lug. The lugs of the negative plates in the cell element are joined together by a cast-on-strap joint. Similarly, the lugs of the positive plates in the cell element are joined together by another cast-on-strap joint.

The conventional method used to manufacture the cast-on-strap joints for lead-acid batteries comprises the steps of: assembling and alignment a plurality of negative and positive plate groups, brushing the plate lug surfaces by means of a rotating horizontal steel brush in order to eliminate lead oxide skins and active material pastes, application of a film of a liquid flux to the freshly brushed plate lug surfaces, at room temperature, by means of a rotating felt brush or by means of a flux-impregnated sponge, and plate lugs joining by the cast-on-strap process. During the latter process, the flux-impregnated plate lugs are introduced into a suitable molten lead-based alloy contained in a suitable metallic mold. Then, the plate lugs are immobilized in such position, and the cast-on-strap joints are formed by subsequent cooling and solidification of the molten alloy in the mold. The mold cavities are previously filled with molten metal either by gravity or pressurized injection.

A characteristic feature of the cell elements produced by the conventional cast-on-strap process just described is the presence of a substantial amount of porosity located mainly at the interface between the plate lugs surface and the solidified metal of the cast-on-strap joints. This porosity is easily visible in cross-sectioned cast-on-strap joints. This type of defect may result in an accelerated corrosion at the pores, with a consequent reduction in the useful life of the batteries.

In order to determine the causes of formation of porosity in the cast-on-strap joints obtained by employing the conventional cast-on-strap process, an extensive research program was conducted. The research led to the development of the present invention. It was discovered that the pores found inside the cast-on-strap joints are due mainly to the presence on the plate lugs surface of residues of lead oxides, greases, oils, active material pastes, fluxes, residual reaction products and humidity, all of which produce substantial volumes of gas on heating in contact with the molten lead-based strap alloy. Since it was observed that several of these factors act together during the conventional cast-on-strap process, it was concluded that pore-free cast-on-strap joints cannot be reproducibly produced by employing a conventional cast-on-strap machine.

Based on a process described in a previous patent application (Ser. No. 08/941,531, filed on Sep. 30, 1997), a new apparatus capable of producing pore-free cast-on-strap joints was developed. This apparatus is used to carry out a three-step cleaning and chemical activation treatment given to a plurality of plate lugs prior to their joining by the cast-on-strap process. The treatment comprises the steps of cleaning the plate lugs by a combined action of a liquid flux and ultrasonic vibration, water rinsing the plate lugs under ultrasonic vibration, and drying the plate lugs by gas blowing. Then, the cast-on-strap joints are formed according to the conventional cast-on-strap process. Since it is important to avoid the re-oxidation of the plate lug surfaces during the time between the application of a liquid flux to them and their joining by the cast-on-strap process, the duration of the intermediate rinsing and drying operations must be kept to a minimum.

The present invention relates to a gas-blowing device used in the new apparatus based on the process described in a previous patent application (Ser. No. 08/941,531, filed on Sep. 30, 1997), which is capable of producing pore-free cast-on-strap joints when coupled to a conventional cast-on-strap machine. The gas-blowing device is used to give a simultaneous final cleaning and drying to a plurality of negative and positive plate lugs immediately after water rinsing the plate lugs under ultrasonic vibration and prior to joining the plate lugs by the cast-on-strap process. It is an object of the present invention to provide a gas-blowing device to be used in the manufacture of cast-on-strap joints which reduces porosity formation.

These and other objects and advantages of the present invention will become apparent from a reading of the attached specification and appended claims.

SUMMARY OF THE INVENTION

According to the present invention, a gas-blowing device is disclosed. This device comprises a metallic pipe closed at both ends and having a plurality of gas outlets having groups of aligned perforations of small diameter evenly distributed along the pipe's length. The perforations are drilled perpendicularly to the pipe's wall. This gas-blowing device is used to give a simultaneous final cleaning and drying to a plurality of negative and positive plate lugs immediately after water rinsing the plate lugs under ultrasonic vibration and prior to joining the plate lugs by the cast-on-strap process. This is done by means of gas jets coming out at high pressure from the gas outlets, and which are directed toward the plate lug surfaces. Clean, dry and oil-free air or an inert gas can be used as the cleaning and drying agent. The device eliminates, in a very fast way and without the application of heat, any remaining contaminants and humidity from the plate lug surfaces. The gas outlets are distributed along the pipe's length in such a way as to allow the simultaneous cleaning and drying of a plurality of plate lug surfaces belonging to a plurality of plate groups. To carry out a gas-blowing operation, the device is placed at the center of the space separating the positive from the negative plate lugs in the plate groups. The gas-blowing device is placed perpendicularly to the plate lug surfaces. Then, each group of gas outlets directs a multiplicity of gas jets simultaneously toward the positive and the negative plate lugs belonging to a particular plate group. All the individual gas jets leaving the gas outlets are parallel to each other, and each one of them is directed in between two plate lug surfaces. The device is provided with the means necessary to assure a uniform distribution of gas pressure and flow rate for all gas outlets located along the entire pipe's length, as well as with the means to assure the correct direction of the gas jets.

DETAILED DESCRIPTION OF THE PREFERRED EMBODIMENTS

Figure 1:
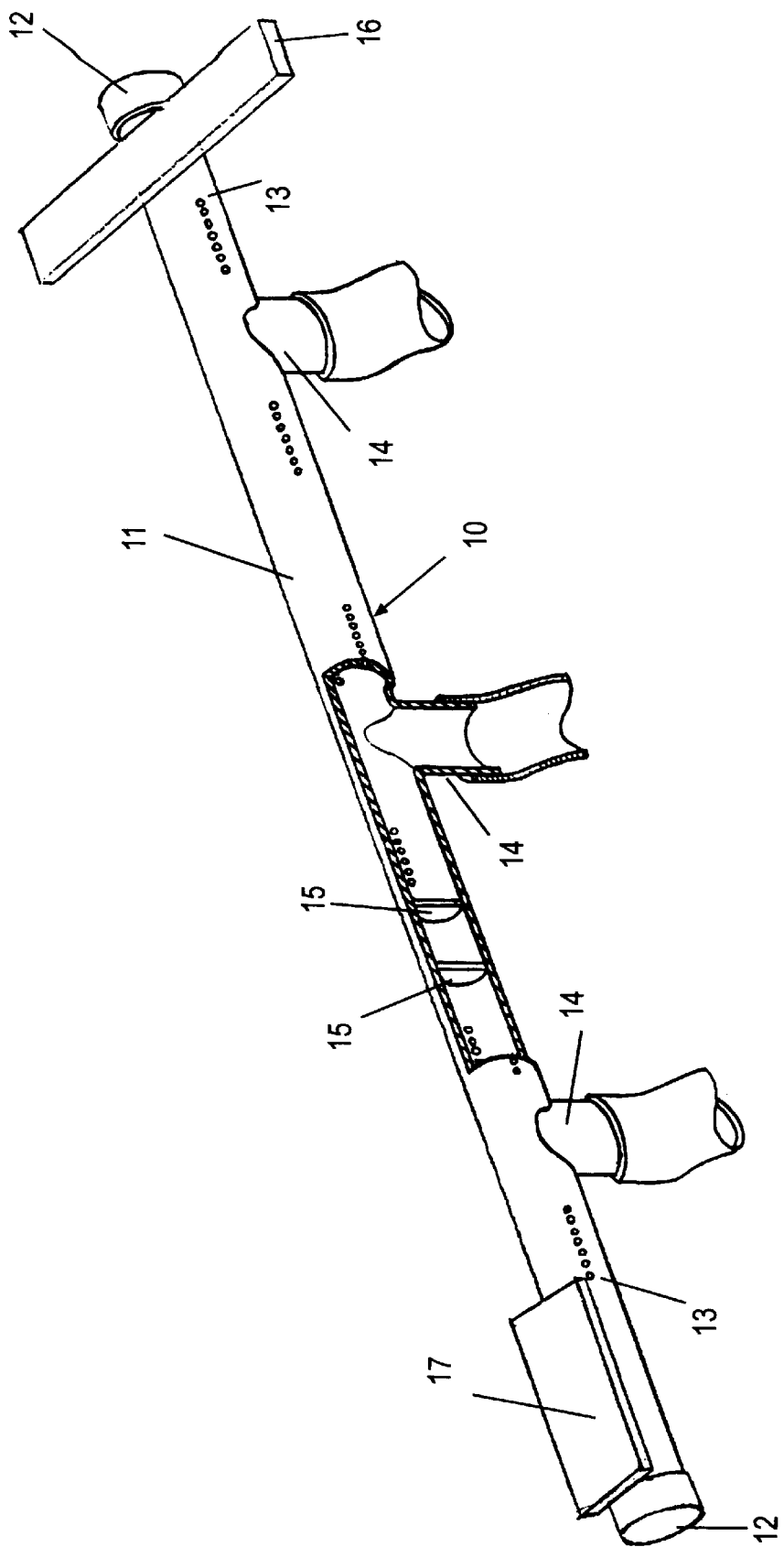
FIG. 1 is an isometric view of the gas-blowing device showing its main components according to the present invention.

Referring to FIG. 1, there is shown a gas-blowing device 10 including a pipe 11 closed at both ends 12 and having a plurality of gas outlets 13, gas inlets 14, and inner plugs 15, all of which are aligned and evenly distributed along the pipe's length. The purpose of inner plugs 15 is to assure a uniform distribution of gas pressure and flow rate for all gas outlets 13 located along the entire pipe's length. Pipe 11 is also provided with leveling plates 16 and 17 on which a spirit level can be positioned in order to level pipe 11 along two space axes, assuring the correct direction of the gas jets leaving the plurality of gas outlets 13.

Figure 2:
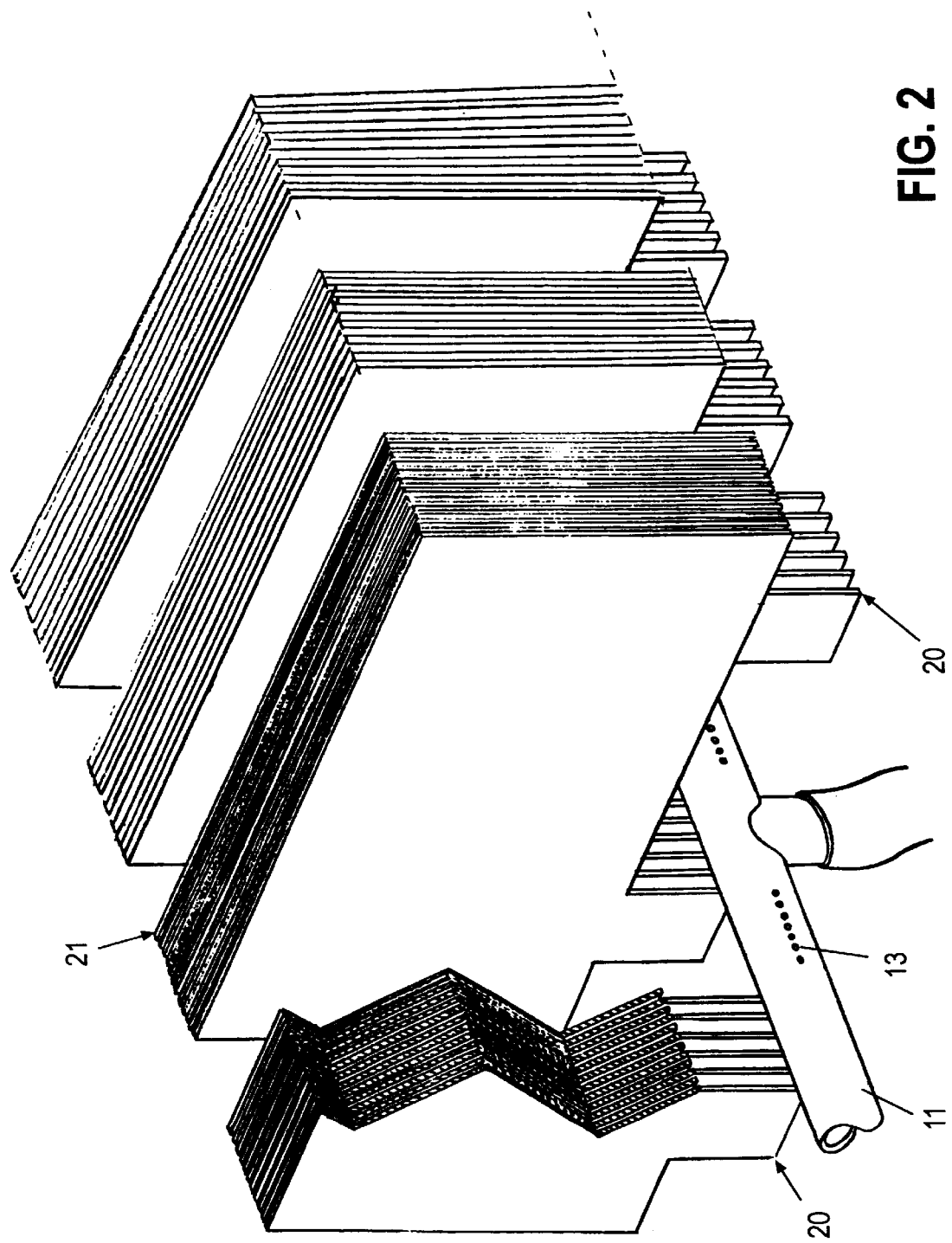
FIG. 2 is an isometric view of the gas-blowing device positioned between the negative and the positive plate lugs of the cell elements of a lead-acid battery, as is used in the present invention.

Referring to FIG. 1 and FIG. 2, the gas outlets 13 are drilled perpendicularly to the pipe's wall, in such a way as to allow the simultaneous cleaning and drying of a plurality of positive and negative plate lugs 20 belonging to a plurality of plate groups 21. As it is shown in FIG. 2, to carry out a gas-blowing operation pipe 11 is centered at the space separating the positive from the negative plate lugs 20 in the plate groups 21. Pipe 11 is placed perpendicularly to the plate lug surfaces. The central axis of all individual gas jets leaving the plurality of gas outlets 13 are parallel to each other, and each one of the gas jets is directed in between two plate lug surfaces. Clean, dry and oil-free air or an inert gas at high pressure can be used.

Thus, as it has been shown, the present invention includes a gas-blowing device for cleaning and drying a plurality of plate lug surfaces. The present invention allows the manufacture of pore-free cast-on-strap joints for lead-acid batteries. The foregoing disclosure and description of the invention is illustrative and explanatory thereof. Various changes in the details of the present device can be made within the scope of the appended claims without departing from the true spirit of the invention. The present invention should only be limited by the following claims and their legal equivalents.

We claim:

1. A gas-blowing device for cleaning and drying a plurality of plate lug surfaces so as to allow for manufacture of pore-free cast-on-strap joints for lead-acid batteries, comprising;

a pipe closed at both ends, said pipe having a plurality of gas outlets aligned and evenly distributed along a length of said pipe; and gas inlets and inner plugs distributed along said length so as to uniformly distribute gas pressure and flow rate for all said plurality of gas outlets located along said length.

2. The gas-blowing device as described in claim 1 further comprising leveling plate means upon which a spirit level is positioned in order to level said pipe along two space axes so as to control an axial direction of gas jets from said plurality of gas outlets, said leveling plate means for positioning of said plurality of gas outlets at a center of a space separating the plate lug surfaces in each plate group.

* * * * *